United States Patent
Padmanathan

[15] 3,687,972
[45] Aug. 29, 1972

[54] AMINE DERIVATIVES OF 1,2-DIHYDROBENZ [cd] INDOLES

[72] Inventor: Thurairajah Padmanathan, Highland Park, N.J. 08904

[73] Assignee: American Cyanamid Company, Stamford, Conn.

[22] Filed: Sept. 2, 1970

[21] Appl. No.: 69,115

[52] U.S. Cl. .........260/326.3, 260/165, 260/326.5 S, 260/326.5 SF, 260/326.5 B, 260/326.9, 260/37, 260/41
[51] Int. Cl. .............................................C07d 27/46
[58] Field of Search..................................260/326.9

[56] References Cited

UNITED STATES PATENTS 3,362,953   1/1968   Brack........................260/240

Primary Examiner—Alex Mazel
Assistant Examiner—Joseph A. Marcavage
Attorney—John L. Sullivan

[57] ABSTRACT

Amine derivatives of 1,2-dihydrobenz [cd] indoles, useful as disperse dyes for synthetic fibers are provided. They conform to the formula selected from (I)

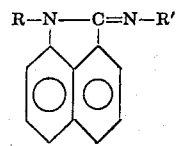

and (II)

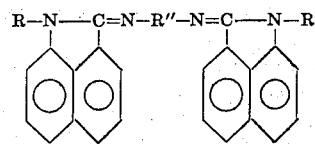

wherein R is hydrogen or methyl; R' is a monovalent aromatic radical selected from phenyl, naphthyl and biphenylyl; R'' is a divalent radical selected from phenylene, naphthylene, biphenylylene and sulfonylbisphenylene; said R' and R'' being either unsubstituted or substituted, the substituents of R' being selected from the group consisting of lower-alkoxy, lower-alkyl, lower-alkylsulfonyl, anilino, benzoyl, 4-carboethoxyphenylazo, carboxymethylcarbamoyl, chloro, lower-dialkylamino, lower-dialkylsulfamoyl, di-(2-carbamoylethyl)sulfamoyl, hydroxy, 2-hydroxyethyl, 4-(2-hydroxyethyl)phenylazo, 2-hydroxyethylsulphenoxy, sulfamoyl and trifluoromethyl, the substituents of R'' being selected from the group consisting of chloro and methoxy; said compound being in the form of its free base of formula I and II, or hydrohalide salt thereof.

5 Claims, No Drawings

AMINE DERIVATIVES OF 1,2-DIHYDROBENZ [CD] INDOLES

This invention relates to 1,2-dihydrobenz[cd]indole compounds useful as dyes for polymeric materials.

Especially this invention relates to amine derivatives of 1,2-dihydrobenz[cd]indole. Depending upon whether the amine is monofunctional or bifunctional, a 2-imino-1,2-dihydrobenz[cd]indole or 2-imino-bis(1,2-dihydrobenz[cd]indole) compound will be obtained. These may be represented by the formulas:

(I) 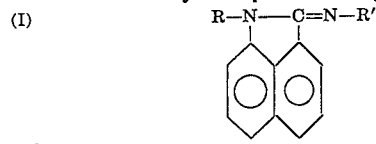

and (II) 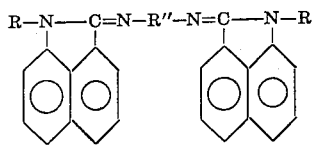

wherein R is hydrogen R' methyl, R' is a monovalent aromatic radical, such as phenyl, naphthyl or biphenyl and R" is a divalent aromatic radical, such as phenylene, napththylene, biphenylene or sulfonylbisphenylene and wherein R' and R" may be further substituted as follows: R' may be substituted by groups such as lower ($C_1$-$C_5$)alkyl, lower ($C_1$-$C_5$) alkoxy, lower alkylsulfonyl, anilino, benzoyl, 4-carboethoxyphenylazo, carboxymethylcarbamoyl, chloro lower ($C_1$-$C_5$)dialkylamino, di-(2-carbamoylethyl)sulfamoyl, dimethylsulfamoyl, hydroxy, 2-hydroxyethyl, 4-(2-hydroxyethyl)phenylazo, 2-hydroxyethylsulfonyl, mercapto, methylmercapto, nitro, 4-nitrophenylazo, phenoxy, sulfamoyl and trifluoromethyl; R" may be substituted by groups such as chloro and methoxy. These compounds are prepared by the reaction of a primary mono or diamine with one or two moles, respectively, of an appropriate 1,2-dihydrobenz[cd]-indole, as hereinafter described.

The compounds of this invention are useful as disperse dyes for polymeric fibers, such as polyacrylonitrile, nylon, polyester, acetate, triacetate and polypropylene fibers. They dye these fibers green-yellow to yellow to orange hues. They represent an improvement in disperse dyes in that they generally have good tinctorial strength and lightfastness on the fiber. As an added advantage, some of the dyes of Table I show fluorescence on the fiber.

The compounds of this invention may be prepared starting with a 2-methylthio-1,2-dihydrobenz[cd]indole hydrohalide ("C"), "C" 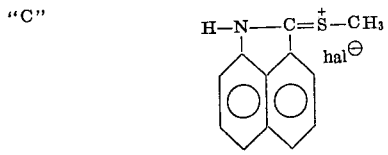

using the method of Ficken and Kendall, J. Chem. Soc., 1960, page 1539 where the hydroiodide, m. 216° (dec.) is described. One or two moles of "C" are used depending upon whether a monoamine or a diamine is employed as a reactant; to give compounds I and II respectively of this invention:

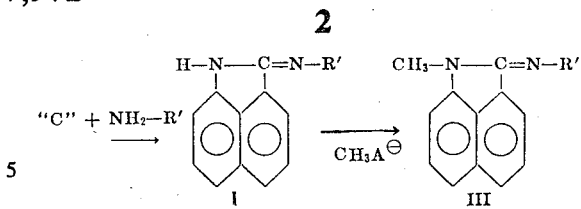

wherein R' is defined as above and $A^\ominus$ is an anion of a strong inorganic acid. The amine, $NH_2$—R', is illustrated hereinafter.

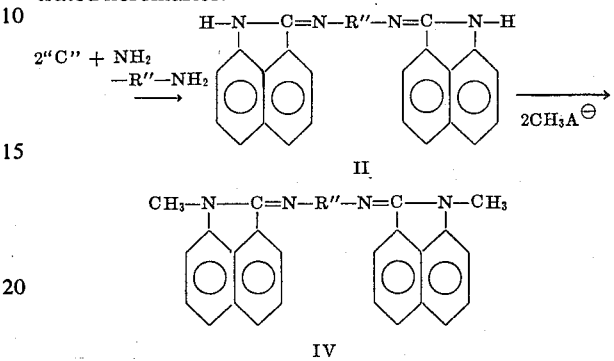

wherein R" is defined as above and $A^\ominus$ is an anion of a strong inorganic acid. The diamine $NH_2$—R'—$NH_2$ is illustrated hereinafter.

Dyes I and II may be methylated to give III and IV having a methyl group in the 1- position of the benz[cd]indole. Compounds III and IV may also be prepared starting with a 1-methyl-2-methylthio-1,2-dihydrobenz[cd]indole hydrohalide, the latter being prepared from the known N-methylnaphthostyril. (Ibid. p. 1539) by sulfurization and quaternization.

The reaction with the mono or diamine is carried out in acetic acid or alcohol in the presence of sodium acetate at reflux temperature. The product is isolated and may be purified by reprecipitation from dimethylformamide by the addition of water. Melting points of the dyes are sharp and vary between about 107° and 303° C. Simple salts of the dyes such as the hydrochloride or hydroiodide are prepared by addition of the hydrohalide either during the isolation or during the reprecipitation. Salts are used where solubility in the dyebath presents a problem beyond normal dispersion.

Amines suitable for the practice of this invention and preferred are:

1. Monoamines such as anilines having the substitutent(s) 4-methoxy, 4-ethoxy, 2,4-dimethoxy, 2-methoxy-4-nitro, 2-chloro-4-nitro, 4-(2-hydroxyethoxycarbonyl), 4-methylthio, 4-($\alpha$, $\alpha$, $\alpha$-trifluoromethyl), 4-(N-acetyl-N-methyl)amino, 4-anilino, 4-benzoyl and 4-(p-amino-o-chlorophenyl)-3-chloro; also monoamines such as p-[4-(2-hydroxyethylphenylazo)]-5-methyl-o-anisidine, p-(4-carboethoxyphenylazo)-5-methyl-o-anisidine, p-nitrophenylazoaniline, 4-chloro-2-naphthylamine.

2. Diamines such as benzidine, 2,2'-dichloro-5,5'-dimethoxybenzidine, bis(4-aminophenyl)sulfone.

Other amines suitable for the practice of this invention are:

1. Monoamines such as anilines having the substitutents 4-chloro-2-nitro, 4-dimethylamino, 4-methoxy or 4-ethoxy-2-nitro, 4- or 5-hydroxy-2-methyl, 5-acetylamino-2-methoxy, 4-mercapto, 4-carboxymethylcarbamoyl, 4-(2-hydroxyethylsulfonyl), 4-(2-hydroxyethyl), 3,5-dichloro-4-hydroxy, 5-chloro and p-phenoxy.

Also monoamines such as p-aminophenol, sulfanilamide, 5-nitro-2-aminophenyl methyl sulfone, $N^4$, $N^4$-diphenyl-1,4-phenylenediamine, $N^5$, $N^5$-diethyltoluene-2,5-diamine, $N^1$, $N^1$-di-methylsulfanilamide, 2-acetamido-4-amino-3-methoxy-4'-nitroazobenzene and 2-amino-6-methylbenzothiazole.

2. Diamines such as p-phenylenediamine, o-chloro-p-phenylenediamine, 1,5-diaminonaphthalene, and 2,2'-dichloro-benzidine.

All of the amines listed above have been used to make the disperse dyes of this invention. The dyes have well-defined melting points and give yellow to orange hues on the fiber.

A preferred group is represented by Formula I above and its salts. Compounds of this group dye modified polyacrylonitrile, nylon, polyester, acetate, triacetate and modified polypropylene fibers, bright green yellow to yellow to orange hues, fast to dry cleaning and gas fading. Most of the preferred dyes show a yellow fluorescence under ultraviolet light. These dyes are especially good on polyacrylonitrile which has been modified by the inclusion of basic comonomers such as vinyl pyridines. When dyed on yarns and fabrics of such modified polyacrylonitrile, they have high tinctorial strength or color value coupled with unusually good lightfastness for disperse yellow as a class. The dyes of Example 3, especially Nos. 1, 2, 3, 5, 8 and 11, have lightfastness ratings of 6 based upon AATCC Method 16A-1964 as well as color strength on such polyacrylonitrile. No. 5, 7 and 10 fluoresce, the latter two with special brilliance; No. 11 also dyes polypropylene modified with basic monomers such as vinyl pyridines. This yellow dye has superior sublimation fastness.

Another dye good for modified polypropylene is that of Example 2 which builds up well in yellow shades and has good zenon arc light and carbon-arc Fadeometer fastness.

The dye of Example 4 is an orange with exceptional fastness to light on nylon and acetate. On nylon it is also fast to sublimation, dry cleaning and gas fading. The third dye mentioned under Example 4 gives yellow shades on polyesters, nylon and acetate. Besides good tinctorial strength, they have exceptional lightfastness.

Generally, the dyes where R = H are preferred to those of R — $CH_3$ for strength of shade although lightfastness is equal.

Compounds prepared from the preferred amines dye all of the six types of fibers mentioned uniform shades of good fastness. The rest dye fibers selectively. For example, when sulfanilamide is used as the amine, a stronger green-yellow is produced on nylon than on the other fibers. Surprisingly, these dyed fibers show an orange fluorescence. Another of the less preferred amines, 5-nitro-2-aminophenylmethylsulfone, gives a Formula I compound which dyes all fibers but polypropylene in yellow shades which have fair visual strength but a strong yellow fluorescence under ultraviolet light. Such dyes are specialty colors.

In general, the compounds of this invention are disperse dyes superior to most yellow to orange disperse dyes in tinctorial strength and lightfastness.

The following examples illustrate this invention.

EXAMPLE 1

2-(4-Chloro-1-naphthylimino)-1,2-dihydrobenz[cd]indole

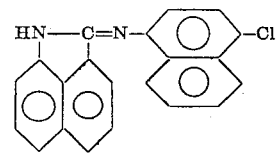

To a mixture of 6.54 g. (0.02 mole) 2-methylthio-1,2-dihydrobenz[cd]indole hydroiodide ("C"), prepared by methylation of thionaphthostyril with methyl iodide in acetone at reflux temperature, as in JACS 1960 1539, 1.65 g. (0.02 mole) sodium acetate and 175 ml. acetic acid, heated to reflux, is added 3.55 g. (0.02 mole) 4-chloro-1-naphthylamine. The whole is heated at reflux for 3 hours, cooled and filtered to separate the precipitated product. The product is washed with dilute sodium hydroxide and by water. It is crystallized from aqueous dimethylformamide to give 6.5 g. orange solid, m. 227–9° C.

When dyed on the fibers of, and using the dyeing procedures of, Example 7, yellow shades are obtained.

EXAMPLE 2

2-(4-Chloro-1-naphthylimino)-1,2-dihydro-1-methylbenz[cd]indole

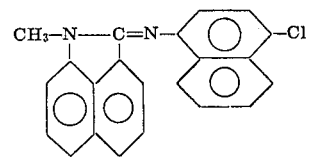

The product of Example 1 is methylated by the following procedure:

To a mixture of 150 ml. dimethylformamide and 30 ml. 5N sodium hydroxide solution is added 3.3 g. (0.01 mole) of the product of Example 1. When solution is complete, 3.3 g. sodium carbonate is added, followed by 13.5 g. iodomethane. The whole is heated at reflux for an hour, cooled, and clarified by filtration. The filtrate is diluted with water to precipitate the product, filtered and the product washed with water. It is recrystallized from dimethylformamide and water, filtered, washed and dried. Yield is 2.22 g. orange solid, m. 167–8° C.

When dyed on fibers of Example 7 with the dyeing procedures of Example 7, yellow shades are obtained. This dye has especially good build-up and lightfastness on modified polypropylene. Xenon fastness is excellent. There is no break at 40 hours in either light (0.1 percent) or medium (0.5 percent) shades.

EXAMPLE 3

2-Arylimino-1,2-dihydrobenz[cd]indoles

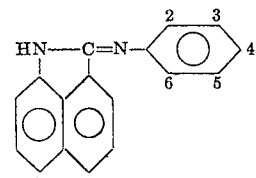

An equimolecular mixture of (1) 2-methylthio-1,2-dihydrobenz[cd]indole hydriodide ("C"), (2) an aniline having the groups indicated in the column below and (3) sodium acetate, is heated at reflux in alcohol or in acetic acid for a few hours. Where a slurry of insoluble product is obtained, the product is filtered, washed with a dilute aqueous alkaline solution and water and reprecipitated from dimethylformamide by the addition of water. Where the final reaction mixture is a solution, dilution with water precipitates the product which is washed and reprecipitated as described.

The following table shows the substitutent(s) on the phenylimino moiety, the melting point of the indole compound obtained and the color obtained when the compound is dyed on the six types of fibers listed in Example 7 using the dyeing procedures of Example 7.

TABLE I

| No. | Substituent(s) on 2-Phenylimino | m.p. °C. | Color of Dyed Fibers 0.5% Shade |
|---|---|---|---|
| 1 | 4-methoxy | 192–3 | bri. green-yellow |
| 2 | 4-ethoxy | 203–4 | bri. green-yellow |
| 3 | 2,4-dimethoxy | 170–1 | yellow |
| 4 | 2-methoxy-4-nitro | 230–1 | yellow |
| 5 | 4-(2-hydroxyethoxycarbonyl) | 178–80 | very green-yellow |
| 6 | 2-chloro-4-nitro | 205–7 | yellow |
| 7 | 4-(α,α,α-trifluoromethyl)·HCl | 286–8 | yellow |
| 8 | 4-methylthio | 172–3 | yellow |
| 9 | 4-anilino | 200–2 | orange |
| 10 | 4-benzoyl | 249–52 | yellow |
| 11 | 4-(p-amino-o-chlorophenyl)-3-chloro | 107–110 | yellow |
| 12 | 4-(N-acetyl-N-methyl)amino | 203–4 | yellow |

EXAMPLE 4

1,2-Dihydro-2-[p-(2-hydroxyethylphenylazo)-2-methoxy-5-methyl phenylimino]benz[cd]indole

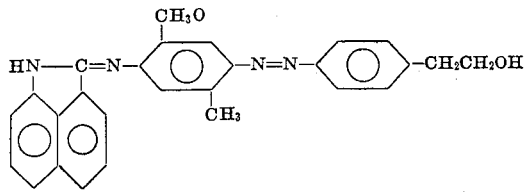

To a solution of 3.27 g. (0.01 mole) 2-methylthio-1,2-dihydrobenz[cd]indole hydriodide ("C") and 0.85 g. sodium acetate in ethanol is added 2.85 g. (0.01 mole) p-(2-hydroxyethylphenylazo)-5-methyl-o-anisidine.

The whole is heated at reflux for seven hours. It is cooled, diluted with water, and basified with dilute sodium carbonate solution and dilute caustic soda solution. The crude product is filtered and recrystallized from dimethylformamide diluted with hydrochloric acid solution. It is dried and leached with hot acetone to give 1.4 g., m. 213°–218° C. of the hydrochloride salt of the product.

When dyed using the procedures of Example 7, orange shades are produced of excellent fastness to sublimation, dry cleaning and gas fading. This dye has especially good color value and lightfastness on nylon and cellulose acetate.

If in the above procedure, the amine reactant is p-(2-carboethoxy)phenylazo-5-methyl-o-anisidine, 3.13 g. (0.01 mole), instead of the one recited, a corresponding orange dye is obtained. Yield is 1.74 g., m. 180°–181.5° C. of the hydrochloride salt of the product. It has good color value and lightfastness on polyester, nylon, acetate, triacetate, modified polypropylene and acrylic fibers when dyed by the procedures of Example 7. Its lightfastness on modified polypropylene is good.

If the amine used above is p-nitrophenylazo aniline, a red-orange solid is obtained, m. 245–7° C. (The hydroiodide salt melts at 275–7° C.) When dyed using the procedures of Example 7 yellow shades of high color value and lightfastness on polyester, nylon and acetate are obtained.

EXAMPLE 5

2,2'-[2,2'-Dichloro-5,5'-dimethoxy-4,4'-biphenylylene)dinitrilo]bis[1,2-dihydrobenz[cd]indole]

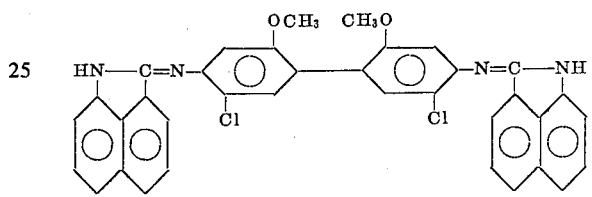

A mixture of 3.27 g. (0.01 mole) "C" and 0.85 g. sodium acetate in 100 ml. acetic acid is brought to reflux. 1.57 g. (0.005 mole) 2,2'-dichloro-5,5'-dimethoxybenzidine is added. The whole is heated at reflux, cooled and recrystallized from dimethylformamide and dilute caustic soda solution, filtered, washed and dried. Yield is 0.9 g., m. 174° C. dec.

When dyed using the procedure of Example 7, a yellow of good color value and lightfastness is obtained on modified polyacrylonitrile.

EXAMPLE 6

[Sulfonylbis(p-phenylenenitrilo)]bis[1,2-dihydrobenz[cd]indole]

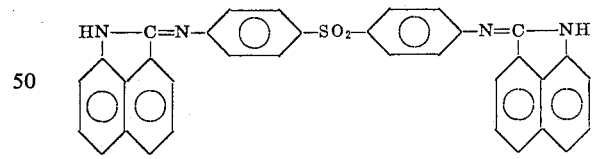

A mixture of 6.43 g. (0.02 mole) "C" with 1.65 g. (0.02 mole) sodium acetate in 175 ml. acetic acid is brought to reflux. Bis(4-aminophenyl)sulfone, 2.48 g. (0.01 mole), is added and the whole heated at reflux three hours. The whole is diluted with caustic soda solution. The product is recrystallized from dimethylformamide, caustic soda and water, filtered and washed, and dried to give 5.29 g. yellow solid, m. 301–3° C.

It dyes polyester and nylon greenish yellow shades of good color value on polyester and nylon. The product has sufficient solubility to omit acetone in using the procedure of Example 7.

EXAMPLE 7

Disperse Dyeing Procedure

A stock dye solution is prepared by dissolving 175 mg. dye in 20 to 30 ml. acetone. This is added to a solution prepared by mixing 7 ml. 5 percent sodium lauryl sulfate solution in 100 ml. water at 120° F. The volume is brought to 350 ml. with water at 100° – 120° F.

A 50 ml. solution of the above dye stock solution is added to 150 ml. water. In the case of dyeing polyesters, a carrier is used in the dyebath. The amount of carrier used is 3 ml. of a 50 percent methyl salicylate aqueous emulsion. With polyacrylonitrile a slightly acidic dyebath is used. This is accomplished by the addition of 2 ml. 28 percent acetic acid solution.

A 5-gram skein of fibers of the type mentioned below is introduced. The dyebath is heated to the temperature indicated below and dyed for one hour at that temperature. It is removed and rinsed. Two types of fibers are scoured, after dyeing, polyester and modified polypropylene. Scouring is done for 10 minutes at the boil in 0.1 percent neutral soap solution followed by rinsing. Then the skeins are dried.

The same procedure may be followed with 5-gram pieces of fabric instead of yarn or skeins.

Polymeric Fibers Dyed polyester (polyethylene terephthalate) at 212° F.
nylon 66 carpet yarn at 208° F.
acetate (cellulose acetate) at 180° F.
triacetate (cellulose triacetate) at 208° F.
polypropylene, modified with a base, at 212° F.
polyacrylonitrile, modified with a base, at 212° F.

A 0.5 percent shade of dye on the weight of the yarn or fabric is obtained by this procedure.

I claim:
1. A compound of the formula selected from

(I) 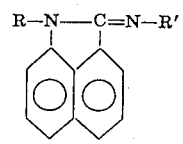

(II) 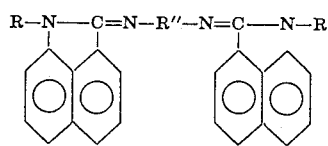

wherein R is hydrogen or methyl; R' is a monovalent aromatic radical selected from phenyl, naphthyl and biphenylyl; R'' is a divalent radical selected from phenylene, naphthylene, biphenylylene and sulfonylbisphenylene; said R' and R'' being either unsubstituted or substituted, the substitutents of R' being selected from the group consisting lower-alkoxy, lower-alkyl, lower-alkylsulfonyl, anilino, benzoyl, carboxymethylcarbamoyl, chloro, lower-dialkylamino, lower-dialkylsulfamoyl, di-(2-carbamoylethyl)sulfamoyl, hydroxy, 2-hydroxyethyl, 2-hydroxyethylsulfonyl, mercapto, methylmercapto, nitro, phenoxy, sulfamoyl and trifluoromethyl, the substitutents of R'' being selected from the group consisting of chloro and methoxy; said compound being in the form of its free base of formula I and II, or hydrohalide salt thereof.

2. 1,2-Dihydro-2-[p-(2-hydroxyethoxycarbonyl)phenyl-imino]benz[cd]indole.

3. 1,2-Dihydro-2-[(p-methylthio)phenylimino]benz[cd]indole.

4. 2-(4-Chloro-1-naphthylimino-1,2-dihydro-1-methyl-benz[cd]indole.

5. N-Benz[cd]indole-2-(1H)-ylidene-2,2'-dichlorobenzidine.

* * * * *